Oct. 22, 1935.  C. LUNDGREN  2,018,183

SUGAR BEET PULLER

Filed Dec. 17, 1934   2 Sheets-Sheet 1

INVENTOR.
CARL LUNDGREN
BY
ATTORNEY.

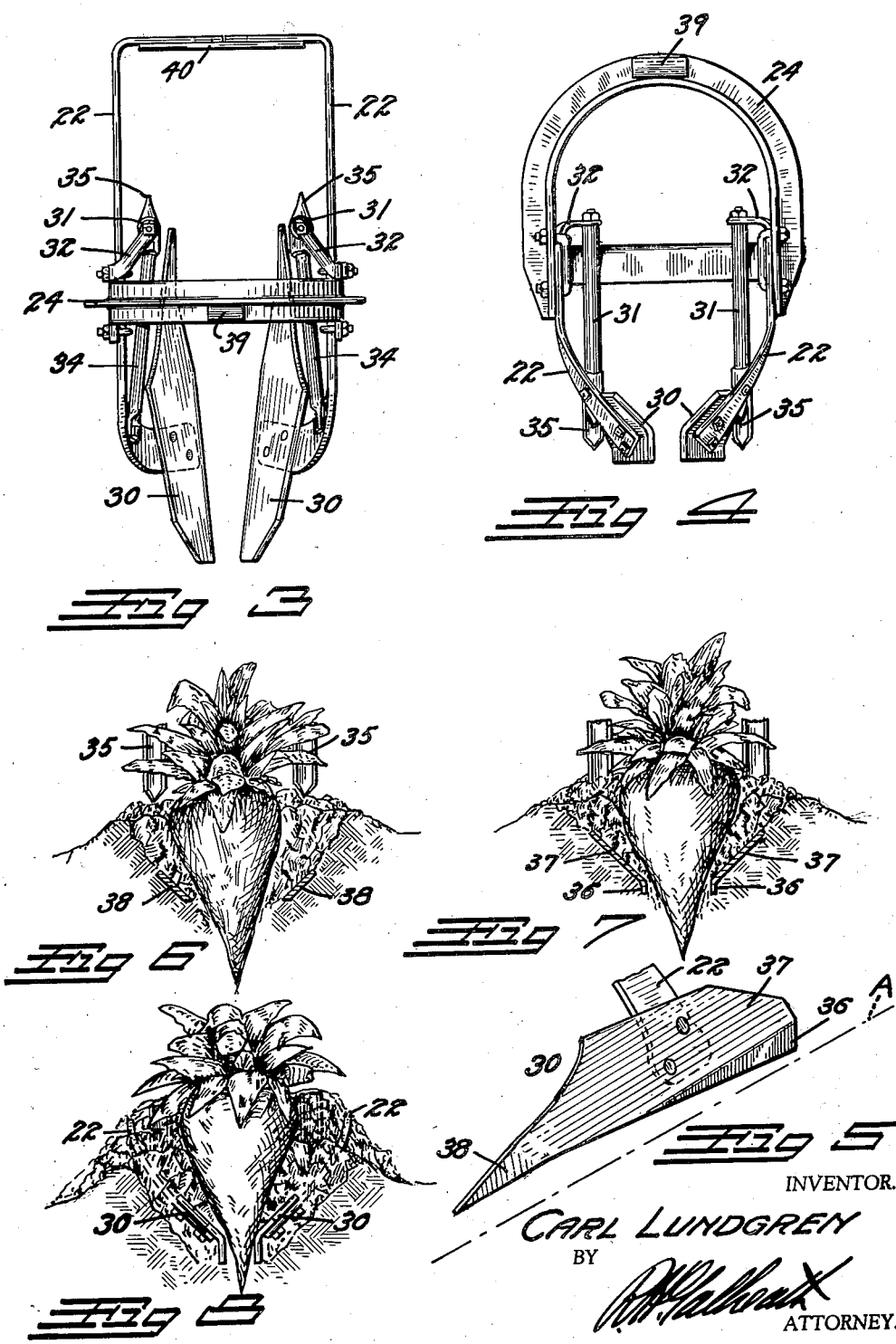

Patented Oct. 22, 1935

2,018,183

UNITED STATES PATENT OFFICE 2,018,183

SUGAR BEET PULLER

Carl Lundgren, Greeley, Colo.

Application December 17, 1934, Serial No. 757,823

10 Claims. (Cl. 55—106)

This invention relates to a sugar beet digger, and has for its principal object the provision of a highly efficient construction which can be readily attached to and carried by a tractor; which can be regulated, adjusted, and guided by the regular tractor equipment; which will efficiently lift the beets to a loose elevated position from which they can be readily gathered without damage to the beets; and which will not become clogged or tangled with the beet tops.

Another object is to construct and shape a digging blade so that it will loosen and break the ground in advance of the beet with a minimum of drag; which will gently and gradually elevate the beet vertically so as not to break the long tap root of the beet; and which will not bring the metal blades themselves into contact with the beet, but will form an earthen wedge between the beet and the blade.

Other objects and advantages reside in the detail construction of the invention, which is designed for simplicity, economy, and efficiency. These will become more apparent from the following description.

In the following detailed description of the invention, reference is had to the accompanying drawings which form a part hereof. Like numerals refer to like parts in all views of the drawings and throughout the description.

In the drawings:—

Fig. 3 is a top view of a single row portion of the device independent of the tractor.

Fig. 4 is a rear view of the portion of Fig. 3.

Fig. 5 is a detail perspective view of a "right hand" digging blade.

Figs. 6, 7, and 8 illustrate the action of the digging blades in elevating or lifting a beet.

Figure 1:
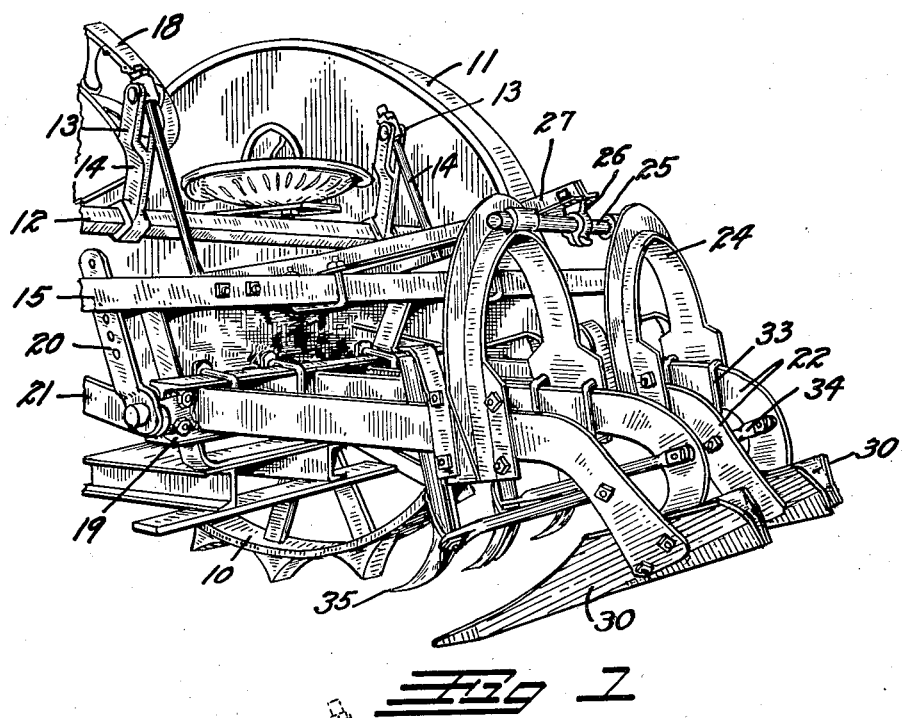
Fig. 1 is a fragmentary perspective view illustrating the rear portion of a typical tractor with the invention applied thereto.
Figure 2:
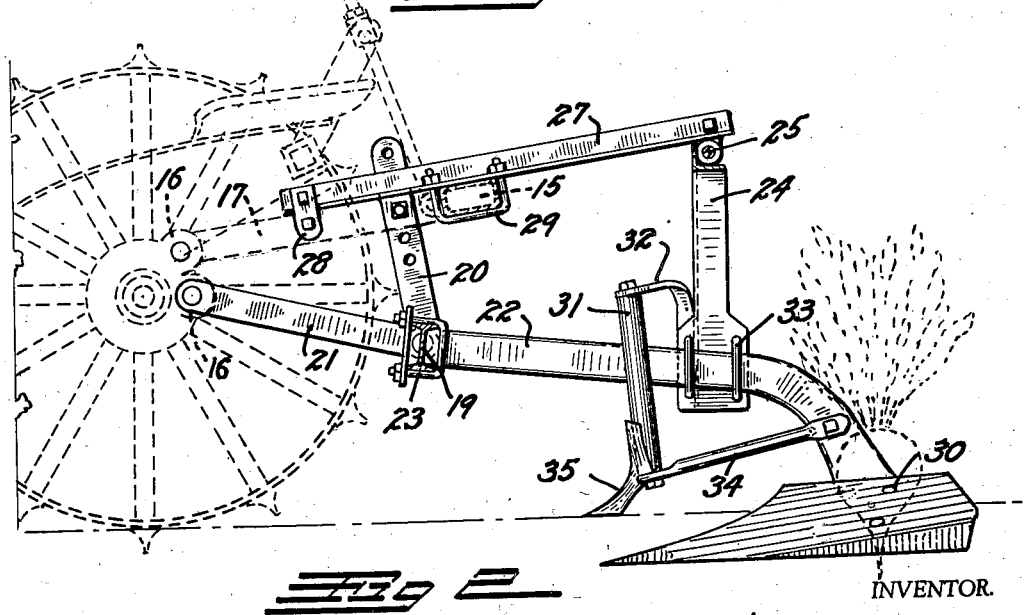
Fig. 2 is a side view of the invention. In this view, the adjacent parts of the tractor are illustrated in broken line.

The invention is applicable to any of the standard tractors. A typical tractor is illustrated in Figs. 1 and 2, the parts of which are designated by numeral as follows: Drive wheel 10, drive wheel guard 11, implement lift shaft 12, lifting levers 13, lifting links 14, implement bar 15. Such a tractor is provided with suitable lugs, such as indicated at 16 in Fig. 2, for attaching the various devices to be drawn by the tractor. The implement bar 15 is attached to the tractor by means of hinged bars 17, and is suspended from the implement links 14. By operation of a suitable hand wheel 18, the bar 12 can be caused to rotate so that the levers 13 will act through the links 14 to raise or lower the implement bar 15.

In attaching the invention to the tractor, the implement bar 15 and the lugs 16 are employed. The invention is attached by suspending a laterally extending I-beam 19 below the implement bar 15. The I-beam 19 is suspended upon adjustable hangers 20 from the hinged bars 17. The traction or pull is transmitted through a pair of draw bars 21 to the lugs 16 at opposite sides of the tractor. It can be readily seen that as the implement bar 15 moves upwardly or downwardly, its movement will be followed by the I-beam 19.

The invention can be adapted for digging any desired number of rows. The mechanism for each row consists of a pair of curved puller arms 22. The forward extremities of the puller arms 22 are L-shaped and are turned inwardly toward each other as shown in Fig. 3, so that they lie end-to-end within the channel of the I-beam 19. They are maintained in this channel by a short flat over-lapping bar 40 which is clamped tightly against the inwardly turned extremities by means of U-bolt clamps 23.

The rearward extremities of the puller arms 22 are spaced and supported by means of inverted, U-shaped yokes 24 positioned about two-thirds of the distance rearwardly from the I-beam 19. The puller arms 22 are secured to the extremities of the yokes by means of U-bolts 33. Supporting sleeves 39 are attached to the yokes 24. These sleeves receive the extremities of a horizontal yoke bar 25 which in turn is suspended through a suitable fitting 26 from the rearward extremity of a V-shaped cantilever 27. The cantilever or boom 27 flares forwardly over the implement bar 15 to an attachment 28 at each side with the hinged bars 17. The V-shaped cantilever is secured to the implement bar 15 where it passes thereover, by means of U-bolts 29. It can be seen that as the implement bar 15 raises or lowers, it will act through the cantilever 27 to raise and lower the yokes 24 and through them the puller arms 22.

The rearward extremities of the arms 22 curve downwardly inwardly and rearwardly, terminating in digging blades 30. Each arm supports a vertically inclined roller 31 between a bracket 32, extending from one of the U-bolts 33, and a lower brace rod 34, extending to the arm 22. The lower portion of this roller is enclosed in a curved top lifting shoe 35.

It is desired to call particular attention to the shape of the shares or digging blades 30, as illustrated in detail in Fig. 5. These blades are formed so that after being shaped their lower edges are substantially horizontal when in the digging position. At the rear the blade extends vertically, forming a triangular vertical face 36 which merges into a sharply inclined lifting face 37. The lifting face 37 narrows and extends forwardly, terminating in a relatively long, sharp, entering or breaking point 38. In Fig. 5, the position of the center line of the row of beets being dug is indicated at "A". The blades are secured to the arms 22, and the latter are formed so that the lower edges of the major portions of the blades approach the center line "A" toward the rear, and the breaking points 38 lie parallel therewith. The breaking points 38 can be made detachable from the blades if desired, so as to allow them to be readily renewed when worn without requiring the entire blade to be renewed.

The tractor illustrated, is equipped for pulling two adjacent rows of beets simultaneously. The tractor is driven astride the two rows, and the hand wheel 13 is adjusted to lower the plows so that the points thereof will travel below the surface at each side of the beets. The top lifters advance along each side of the row, and lift any beet tops which may be lying upon the ground. The beet tops are rolled between the rollers 30 out of contact with the arms 22.

The breaking points 38 enter in advance of the blades, and break loose the hardened top soil with a gentle wedging action. They are followed by the inclined and gradually rising lifting surfaces 30. The surfaces 30 gradually approach each other, and, owing to their upward and outward incline towards the rear, act to gently compress a wedge or cushion of earth inwardly and upwardly. The beets are compressed in this wedge of earth and pulled vertically from the ground. This gentle vertical movement loosens the long tap roots and, since the beets are not bent forwardly, the tap roots are not broken but are pulled from the ground. This not only eliminates the loss of weight of the tap roots but also allows the tap roots to remain protected by the earth from freezing and drying until they are lifted by the topper. The erect loose position of the dug beets in the mulched earth facilitates the gathering of the beets by the toppers who follow the digging operation.

The angle of entrance or "suction" of the blades can be readily adjusted by raising or lowering the adjusted position of the hangers 20 on the hinged bars 17. This raises or lowers the I-beam 19 and causes the yokes 24 to swing about the shaft 25 to cause the blades to enter more or less steeply, as desired.

The forward extremities of the puller arms can be easily shifted to the right or left by simply loosening the U-bolt clamps 23 and the yokes 24 can be slid to the right or left along the shaft 25 to provide a ready adjustment to any spacing of the beet rows to be dug. This construction allows the two sets of puller arms to be brought close together so that the pulling of adjacent rows simultaneously is possible.

The invention has been illustrated arranged for digging two adjacent rows simultaneously. It is, of course, not limited to use upon two rows. A single set can be employed for a single row or the I-beam 19 can be increased in length so as to support additional sets for pulling three, four, or more rows.

It is desired to call attention to the advantages of the particular shape of the puller arms and shares. In the usual beet puller the puller arms extend downwardly and forwardly to the shares. This causes the arms to follow through the beets and tops after the digging operation and be behind the beets as they are pulled. This causes the beet tops to wrap about the arms so as to drag and pile the beets and clods until the digger is clogged and must be stopped and cleaned by hand. With this invention the puller arms have passed the beets before the latter are dug and lifted so that the tops of the dug beets have nothing upon which to catch after they are dug and dragging and clogging are eliminated. The soil ahead of the beams is lifted so high that no space remains in front of and under the beams for leaves or other debris to gather. Therefore clogging is absolutely eliminated.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A beet digging device for attachment to a tractor comprising: a horizontal beam secured to said tractor and vertically adjustable thereon; a pair of puller arms extending rearwardly from said horizontal beam, and curving downwardly and inwardly at their rearward extremities; a digging blade secured to the lower rearward extremity of each arm; an inverted U-shaped yoke secured at its lower extremities to said arms; and means for supporting said yoke from said tractor.

2. A beet digging device for attachment to a tractor comprising: a horizontal beam secured to said tractor and vertically adjustable thereon; a pair of puller arms extending rearwardly from said horizontal beam, and curving downwardly and inwardly at their rearward extremities; a digging blade secured to the lower rearward extremity of each arm; an inverted U-shaped yoke secured at its lower extremities to said arms; means for supporting said yoke from said tractor; a curved shoe supported ahead of each digging blade at a height which permits the shoe to travel substantially at the ground surface when the blade is therebelow.

3. A beet digging device for attachment to a tractor comprising: a horizontal beam secured to said tractor and vertically adjustable thereon; a pair of puller arms extending rearwardly from said horizontal beam, and curving downwardly and inwardly at their rearward extremities; a digging blade secured to the lower rearward extremity of each arm; an inverted U-shaped yoke secured at its lower extremities to said arms; means for supporting said yoke from said tractor; means for rotatably supporting said horizontal beam; and means for raising and lowering said yokes, said raising and lowering being accommodated by the rotation of said horizontal beam.

4. A beet pulling attachment for tractors comprising: an axially pivoted channeled beam; a pair of puller arms, said arms being turned inwardly toward each other at their forward extremities so as to lie within the channel of said beam; and curved downwardly and inwardly toward each other at their rearward extremities;

lifting blades secured to said inwardly turned rearward extremities; a clamping bar overlying the inwardly turned forward extremities in said channel; means for clamping said bar against said latter extremities; and means for maintaining said rearward extremities in their proper spaced relation.

5. A beet digging device for attachment to a tractor comprising: a horizontal beam secured to said tractor and vertically adjustable thereon; a pair of puller arms extending rearwardly from said horizontal beam, and curving downwardly and inwardly at their rearward extremities; a digging blade secured to the lower rearward extremity of each puller arm; an inverted U-shaped yoke secured at its lower extremities to said arms; means for supporting said yoke from said tractor; a curved shoe supported ahead of each digging blade at a height which permits the shoe to travel substantially at the ground surface when the blade is therebelow; and a roller extending upwardly from each of said shoes.

6. A two-row beet puller for attachment to a tractor comprising: a channeled horizontal beam; means for rotatably supporting said horizontal beam from said tractor; two pairs of puller arms extending rearwardly from said horizontal beam; inwardly turned extremities on the puller arm of each pair; means for clamping the latter extremities within the channel of said horizontal beam; downwardly and inwardly turned rearward extremities on each pair of arms; digging blades secured to said rearward extremities; an inverted U-shaped yoke holding the rearward extremities of each pair of arms in fixed relation; a horizontal bar extending between said yokes; a boom arranged for attachment to said tractor; and means for suspending said horizontal bar from said boom.

7. A two-row beet puller for attachment to a tractor comprising: a channeled horizontal beam; means for rotatably supporting said horizontal beam from said tractor; two pairs of puller arms extending rearwardly from said horizontal beam; inwardly turned extremities on puller arms of each pair; means for clamping the latter extremities within the channel of said horizontal beam; downwardly and inwardly turned rearward extremities on each pair of puller arms; digging blades secured to said rearward extremities; an inverted U-shaped yoke holding the rearward extremities of each pair of puller arms in fixed relation; a horizontal bar extending between said yokes; a boom arranged for attachment to said tractor; and means for suspending said horizontal bar from said boom, said digging blades comprising inclined surfaces secured directly to the inwardly turned, rearward extremities of said arms, said surfaces approaching each other toward the rear of said blade.

8. A two-row beet puller for attachment to a tractor comprising: a channeled horizontal beam; means for rotatably supporting said horizontal beam from said tractor; two pairs of puller arms extending rearwardly from said horizontal beam; inwardly turned extremities on the puller arms of each pair; means for clamping the latter extremities within the channel of said horizontal beam; downwardly and inwardly turned rearward extremities on each pair of puller arms; digging blades secured to said rearward extremities; an inverted U-shaped yoke holding the rearward extremities of each pair of puller arms in fixed relation; a horizontal bar extending between said yokes; a boom arranged for attachment to said tractor; means for suspending said horizontal bar from said boom, said digging blades comprising: inclined surfaces secured directly to the inwardly turned, rearward extremities of said arms, said surfaces approaching each other toward the rear of said blade; and forwardly extending, breaking points extending from said surfaces and extending in substantially parallel relation forwardly therefrom.

9. A two-row beet puller for attachment to a tractor comprising: a channeled horizontal beam; means for rotatably supporting said horizontal beam from said tractor; two pairs of puller arms extending rearwardly from said horizontal beam; inwardly turned extremities on the arms of each pair; means for clamping the latter extremities within the channel of said horizontal beam; downwardly and inwardly turned rearward extremities on each pair of puller arms; digging blades secured to said rearward extremities; an inverted U-shaped yoke holding the rearward extremities of each pair of puller arms in fixed relation; a horizontal bar extending between said yokes; a boom arranged for attachment to said tractor; means for suspending said horizontal bar from said boom, said digging blades comprising: inclined surfaces secured directly to the inwardly turned, rearward extremities of said arms, said surfaces approaching each other toward the rear of said blade; forwardly extending, breaking points extending from said surfaces and extending in substantially parallel relation forwardly therefrom; and vertical surfaces extending downwardly from the rearward edge of said inclined surfaces, the lower edges of said vertical surfaces, said inclined surfaces and said breaking points being substantially in horizontal alignment when in the digging position.

10. A two-row beet puller for attachment to a tractor comprising: a channeled horizontal beam; means for rotatably supporting said horizontal beam from said tractor; two pairs of puller arms extending rearwardly from said horizontal beam; inwardly turned extremities on puller arms of each pair; means for clamping the latter extremities within the channel of said horizontal beam; downwardly and inwardly turned rearward extremities on each pair of puller arms; digging blades secured to said rearward extremities; an inverted U-shaped yoke holding the rearward extremities of each pair of arms in fixed relation; a horizontal bar extending between said yokes; a boom arranged for attachment to said tractor; and means for suspending said horizontal bar from said boom, said boom comprising a flat V-shaped frame secured at its apex to said horizontal bar, and at its separated extremities to said tractor.

CARL LUNDGREN.